Figure 1:
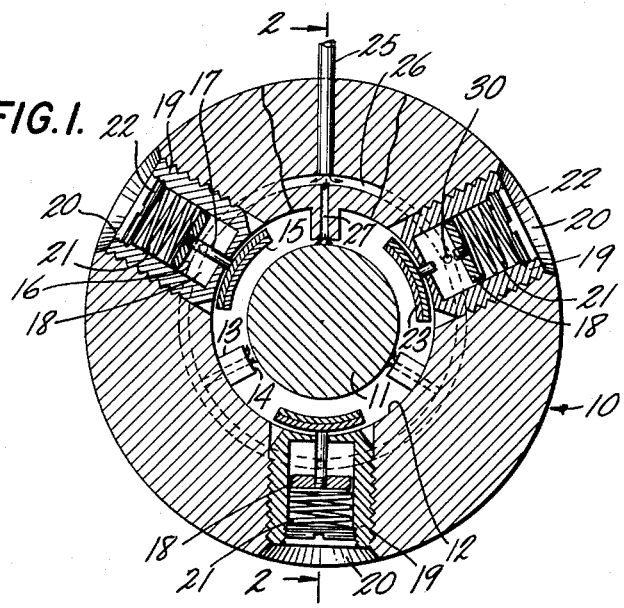

May 10, 1960    J. L. WEILER    2,936,197
FLUID BEARING STRUCTURE
Filed Nov. 25, 1957

INVENTOR.
JOHN L. WEILER

BY his ATTORNEYS.

United States Patent Office 2,936,197
Patented May 10, 1960

2,936,197

FLUID BEARING STRUCTURE

John L. Weiler, Freeport, N.Y., assignor to Fairchild Engine and Airplane Corporation, Hagerstown, Md., a corporation of Maryland Application November 25, 1957, Serial No. 698,634

7 Claims. (Cl. 308—73)

This invention relates to a fluid bearing for a rotatable shaft and, more particularly, to a fluid bearing structure which accommodates a plurality of bearing sections for movement into position for supporting the rotating shaft when the pressure of the fluid acting on the shaft falls below a predetermined value.

The fluid bearing structure of the present invention is particularly applicable, but by no means limited, to machinery, such as air cycling machines, installed in high speed aircraft. Such machines must be designed to operate at high speed in ambient temperatures of 500° F. or higher, and conventional bearings and lubricants are incapable of satisfactory performance at these elevated temperatures. Fluid bearings, however, have proved satisfactory to a degree, but where fluid bearings are employed, metal bearing surfaces or pads must be provided for the support of the rotating shaft when the source of fluid supply is stopped or for some reason the pressure of the fluid is reduced below the level which is required for the support of the rotatable shaft. In aircraft, for example, the source of the fluid used in the support of the bearing may be the high pressure air bleed from the aircraft's jet engine. When the engine is stopped or when it is operating at low or idle speeds, the pressure of the fluid supplied to the bearing structure is reduced below the minimum pressure required in the bearing, and wearing or galling of the bearing surfaces or bearing pads and the rotating shaft may result because of the frictional contact therebetween. In addition, when the pressure of the fluid supplied to the bearing structure is substantially reduced, vibrations may develop in fluid bearings, particularly in bearings in which appreciable clearance is provided between the bearing surfaces and the shaft in the expectation that the shaft will seldom, if ever, be supported by these surfaces for rotation at high speeds and at high temperatures.

To overcome these objections of conventional fluid bearings, the present invention provides a fluid bearing structure in which the rotatable shaft is supported by retractable bearing sections when the fluid pressure is not sufficiently high to support the bearing for floating rotation. However, when the fluid pressure increases above the level which is required to support the shaft for floating rotation, the bearing sections are automatically retracted to inoperative position out of contact with the rotatable shaft.

Figure 2:
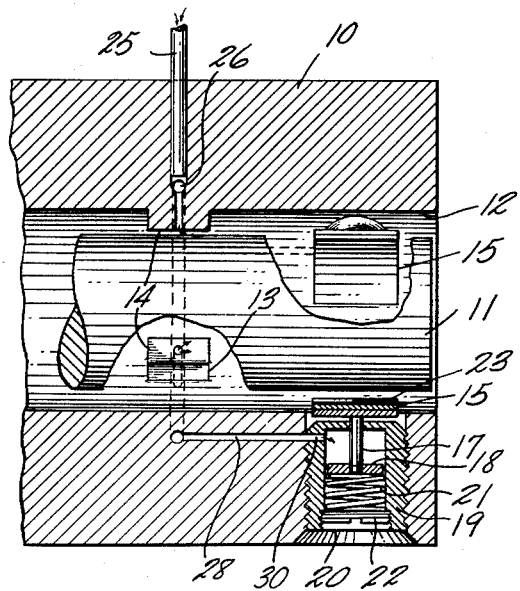

For a complete understanding of the present invention, reference may be made to the detailed description which follows and to the accompanying drawing in which:

Figure 1 is a cross-sectional view of the bearing structure of the present invention, taken on a plane substantially perpendicular to the axis of rotation of the shaft; and Figure 2 is a cross-sectional view taken along the line 2—2 of Figure 1.

Referring to the drawing, the bearing structure of the present invention comprises an annular housing 10 which surrounds a portion of the rotatable shaft 11 to be supported. The inner diameter, defined by the surface 12, of the housing 10 is substantially greater than the outside diameter of the shaft, providing substantial clearance therebetween. A plurality of pads or blocks 13 are formed integrally with the inner surface 12 of the housing, and they are spaced apart at equal distances around the rotatable shaft. The inner surfaces 14 of the pads are concavely curved in complementary fashion to the outer periphery of the shaft. Frictional contact between the surfaces 14 and the outer periphery of the shaft is not contemplated in the normal operation of the bearing structure of the present invention and, therefore, a small clearance is provided between the outer periphery of the shaft and these surfaces.

The housing 10 accommodates a plurality of radially movable bearing sections 15 therein, and these bearing sections are movable in unison toward and away from the shaft by pressure controlled actuators which will be described. More specifically, each of the bearing sections 15 is connected to a movable piston 16 by means of a connecting rod 17. Each piston 16 is movable within a radially extending bore 18 of a hollow, exteriorly threaded, cylindrical plug 19 which is threaded into an internally threaded, radially extending opening 20 formed in the housing 10. The piston 16 is urged toward the rotatable shaft by a compressed spring 21 accommodated between the outer surface of the piston and a retaining disk 22 which is threaded into the end of the hollow plug. The disk 22 serves not only as a retaining member for the compressed spring but also as a seal for the piston bore or chamber 18.

The inner end of the hollow plug 19 is provided with an opening which helps guide the connecting rod 17 in its axial movement.

The bearing sections 15 are intended to support the shaft when the shaft is at rest, or during operation when for some reason the fluid pressure is not high enough to effectively support the rotatable shaft. Under these conditions, the bearing sections are spring urged into contact with the outer periphery of the shaft. Each bearing section is provided with a special facing 23, made of carbon or carbon impregnated with copper, to reduce friction and to prevent damage to the shaft.

However, under normal operating conditions the rotatable shaft is supported by fluid supplied under high pressure through the conduit 25 to the manifold 26 within the bearing housing 10 and surrounding the rotatable shaft. A radially extending restricted passage 27 is formed through each of the pads 13, and these passages all communicate with the manifold 26 directing the fluid under pressure in a jet stream against the outer periphery of the shaft to floatingly support the rotatable shaft by the fluid film or layer between the outer periphery of the rotating shaft and the inner surfaces 14 of the pads 13. In this way, the rotatable shaft is supported by the fluid film out of frictional contact with these surfaces. The fluid pressure should not, of course, be permitted to build up within the housing 10, and therefore one or both ends of the housing is open to permit the fluid to be exhausted therefrom.

The manifold 26 also communicates by means of a series of axial passages 28 in the bearing housing with the piston bores or chambers 18 within each of the hollow plugs 19. The wall of each plug 19 is formed with a port 30 which is brought into alignment with the passage 28 to admit the fluid into the inner end of the chamber, so that the pressure of this fluid acts upon the movable piston 16 in opposition to the effect of the compressed spring 21. When the pressure of the fluid against the piston 16 exceeds the pressure exerted by the spring, the bearing sections 15 will be retracted away from the rotating shaft to inoperative positions. On the other hand, when the pressure of this fluid is below a predetermined value, the effect of the spring will overcome the pressure of the fluid and move the bearing sections toward the outer periphery of the rotating shaft.

The bearing sections should come into contact with the rotating shaft almost simultaneously in order to maintain the concentricity of the shaft relative to the surfaces 14 of the pads. Preferably, the apparatus is designed so that the bearing sections will move into operative position to support the rotating shaft at a pressure of the fluid above the critical pressure at which the fluid is incapable of supporting the shaft. This will prevent the shaft from coming into contact with the surfaces 14 of the pads.

The air pressure supplied by the conduit 25 may be obtained from any suitable source of pressurized fluid. However, in high speed aircraft, this fluid may be air supplied by a scoop from the slipstream, air bled from the intake of the main turbine engines, or air supplied from a compressor or other air cycle machine capable of supplying non-contaminated air at high pressure. Other gaseous or liquid fluids may be used in lieu of air.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

I claim:

1. A fluid bearing structure for a rotatable shaft comprising a supporting structure having an opening therein to receive the rotatable shaft, means communicating with a source for supplying a fluid under pressure in different directions into the opening for the support of the rotatable shaft, a plurality of bearing sections movable relative to said supporting structure toward and away from the center of the opening, the bearing sections in their inwardly positions cooperating to form a bearing, pressure actuated means for controlling the position of the bearing sections, and passage means communicating with the same source of fluid for supplying fluid under pressure to the pressure actuated means so that as the pressure of the fluid increases the bearing sections will be retracted to inoperative positions.

2. A bearing structure for a rotatable shaft comprising a housing having an opening therein for receiving the rotatable shaft, a supply conduit in communication with a source of fluid under pressure, a manifold in communication with the supply conduit and directing the fluid under pressure into the opening in the housing in different directions for the support of a rotatable shaft therein, a plurality of bearing sections accommodated within the housing for movement toward and away from the center of the opening, means for urging the bearing sections inwardly, pressure controlled actuating means connected to each of the bearing sections, and passage means in communication with the source of fluid under pressure for conducting the fluid into communication with the pressure controlled actuating means, whereby the fluid pressure, if high enough, moves the bearing sections to retracted positions.

3. A bearing structure and a rotatable shaft, the bearing structure comprising a plurality of shaft-engaging elements movable into engagement with the shaft for the support thereof, means communicating through fluid passages with a source of fluid under pressure for directing a plurality of streams of the fluid against the shaft, thereby supporting the shaft for floating rotation, and actuating means in communication with the source of fluid under pressure for moving the shaft-engaging elements out of engagement with the rotatable shaft when the pressure of the fluid is sufficiently high to support the shaft independently of the shaft-engaging elements.

4. A fluid bearing structure and a rotatable shaft, the fluid bearing structure comprising a supporting structure, a plurality of pads supported by the supporting structure and surrounding the shaft, said pads having inner surfaces spaced closely to the outer periphery of the shaft but presenting a slight clearance therebetween, means forming a passage through each of the pads to introduce the fluid under pressure into said space between the said inner surface of the pad and the outer periphery of the shaft, said fluid forming a fluid layer between the inner surfaces and the shaft to floatingly support the shaft, a plurality of bearing sections movable relatively to the supporting structure toward and away from the outer periphery of the shaft, actuator means connected to the bearing sections, means forming a bore within the supporting structure for guiding the actuator means for movement therein, means acting against the actuator means to urge the bearing sections toward the shaft, the bearing sections in their positions engaging the shaft cooperating to support the shaft, and passage means for conducting the fluid into communication with the actuator means to urge the bearing sections to retracted positions when the pressure of the fluid is above a predetermined value.

5. A fluid bearing structure as set forth in claim 4, including passage forming means connecting the passages in the pads and the passage means for conducting the fluid into communication with the actuator means.

6. A fluid bearing structure for a rotatable shaft comprising an annular supporting structure having an opening therein for receiving the rotatable shaft, blocks supported by the annular supporting structure within the shaft opening thereof, said blocks being equally spaced around the circumference of said opening, means defining a fluid passage within said blocks, a plurality of auxiliary shaft-supporting elements mounted for movement relative to said annular supporting structure toward and away from the center of the opening, means urging the shaft-supporting elements inwardly toward operative position, and pressure actuated means connected to the shaft-supporting elements and communicating with a source of fluid under pressure, the fluid pressure urging the shaft supporting elements outwardly to inoperative positions.

7. A fluid bearing structure as set forth in claim 6, including means connecting the fluid passages and the pressure actuated means to the same source of fluid pressure so that as the pressure of the fluid increases the shaft-supporting elements will be retracted to inoperative positions.

References Cited in the file of this patent

UNITED STATES PATENTS 2,003,316     Schein                   June 4, 1935